United States Patent
Lin et al.

(10) Patent No.: US 8,306,360 B2
(45) Date of Patent: Nov. 6, 2012

(54) DEVICE AND METHOD FOR OBTAINING CLEAR IMAGE

(75) Inventors: Yi-Chun Lin, Taipei (TW); Chih-Wei Chen, Taipei (TW); Chiou-Shann Fuh, Shulin (TW); Ming-Huang Shih, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 976 days.

(21) Appl. No.: 12/003,976

(22) Filed: Jan. 4, 2008

(65) Prior Publication Data

US 2009/0129674 A1 May 21, 2009

(30) Foreign Application Priority Data

Sep. 7, 2007 (TW) .............................. 96133550 A

(51) Int. Cl.
*G06K 9/36* (2006.01)
*G09G 5/00* (2006.01)
*H04N 9/74* (2006.01)
*H04N 9/75* (2006.01)
*H04N 9/76* (2006.01)

(52) U.S. Cl. .................. 382/284; 345/629; 348/584

(58) Field of Classification Search .................. None
See application file for complete search history.

(56) References Cited

U.S. PATENT DOCUMENTS

| 6,411,339 | B1* | 6/2002 | Akutsu et al. | 348/584 |
| 7,418,150 | B2* | 8/2008 | Myoga | 382/260 |
| 2003/0190090 | A1* | 10/2003 | Beeman et al. | 382/284 |
| 2004/0165785 | A1* | 8/2004 | Monobe et al. | 382/268 |
| 2005/0128323 | A1* | 6/2005 | Choi | 348/239 |
| 2007/0086645 | A1* | 4/2007 | Kim et al. | 382/154 |
| 2008/0095466 | A1* | 4/2008 | Kinrot et al. | 382/284 |
| 2011/0206292 | A1* | 8/2011 | Hanamoto et al. | 382/260 |

FOREIGN PATENT DOCUMENTS

CN 1402191 A 9/2002

* cited by examiner

*Primary Examiner* — Randolph I Chu

(74) *Attorney, Agent, or Firm* — Rosenberg, Kleni & Lee

(57) ABSTRACT

A device and a method for obtaining a clear image, the method is executed by a digital signal processor (DSP) chip or a microprocessor. Through merging clear parts of two images with different focal lengths, a single clear image is obtained. The image is divided into a plurality of blocks, and then edge detection is processed to obtain an edge image. Blocks having more complete edge information are selected as clear blocks. Then, the clear blocks are further merged into a single clear image. Once the images are processed with the method, a depth of field of the image can be adjusted, without adding hardware elements of a digital camera such as a variable diaphragm.

10 Claims, 3 Drawing Sheets
(1 of 3 Drawing Sheet(s) Filed in Color)

DEVICE AND METHOD FOR OBTAINING CLEAR IMAGE

CROSS-REFERENCE TO RELATED APPLICATIONS

This non-provisional application claims priority under 35 U.S.C. §119(a) on Patent Application No(s). 096133550 filed in Taiwan, R.O.C. on Sep. 7, 2007, the entire contents of which are hereby incorporated by reference.

BACKGROUND OF THE INVENTION

1. Field of the Invention

The present invention relates to an image processing method, and more particularly to an image processing method for obtaining a single clear image by merging a plurality of images with different depths of field.

2. Related Art

The depth of field refers to the range of clear vision in front of and behind the focus when focusing at a point. The depth of field is relevant to the diaphragm, lens, shooting position, and distance to the shot object: the larger the diaphragm is, the shallower the depth of field is, and the smaller the diaphragm is, the deeper the depth of field is; the longer the focal length of the lens is, the shallower the depth of field is, and on the contrary, the shorter the focal length of the lens is, the deeper the depth of field is; and the depth of field is relatively shallow when the distance to the shot object is relatively small, and it is relatively deep when the distance to the shot object is relatively large. Among the above, the most direct and effective manner for adjusting the depth of field is to change the diaphragm. When taking a picture, in order to highlight the person in the picture and to make the surroundings be vague, a larger diaphragm is selected to obtain a shallower depth of field; on the contrary, in order to shoot scenery or building, a smaller diaphragm is selected to obtain a deeper depth of field, so as to make all the sceneries in the front and back become clear.

As the technology for manufacturing digital camera (DC) components is rapidly developed and becomes mature, DC modules are embedded into electronic devices such as mobile phones, personal digital assistants (PDAs), MP3 players and laptop computers, so as to enable users to enjoy taking pictures at anytime and anywhere. As these electronic devices are required to be designed light, thin, short, and small, easy to carry along with, and convenient to operate, the built-in DC modules in most of these electronic devices are designed to have fixed focal length and fixed diaphragm. In order to meet the requirements of shooting near and distant objects, the DC module in certain electronic device drives the lens module of the camera through utilizing physical principles such as electromagnetic forces, so as to adjust the focal length, and thus achieving the multi-stage zooming effect without excessively enlarging the size of the DC module. Currently, the DC modules applied in these portable electronic devices still use fixed diaphragms, that is because, non-fixed diaphragms utilize multi-blade design or motor driving mode in DC modules to control the size of the diaphragm, which occupy larger space than DC modules with fixed diaphragms. However, the users now have higher requirements on the quality of images taken by these electronic devices, and most users expect the DC modules of the electronic devices to break the technical bottleneck of the depth of field, i.e., expect the depth of field to be adjustable, so as to obtain clear images of the foreground or full range. Some solutions are to merge a plurality of images with different focal lengths into a full-range clear image. For example, in PRC Patent Publication No. CN1402191A, an image is divided into a plurality of blocks, and then the image is converted into frequency domains through "discrete wavelet frame". Then, parts of the blocks are compared to determine whether the block is a clear or vague block. Finally, clear parts of the blocks in two images are selected to be merged to obtain a single clear image. The defects of this method lie in that, a lot of calculation resources are consumed to convert digital images from space domains into frequency domains, and image edges are obviously existed after the images are merged (the image edges are too clear or vague), and thus the images become rather unnatural.

SUMMARY OF THE INVENTION

In view of the above problem that the depth of field of the shot object cannot be adjusted when the fixed diaphragm is used, the present invention is directed to a device and method capable of merging clear parts of two images with different focal lengths into a single clear image, so as to adjust a depth of field of the image without using a variable diaphragm.

In order to achieve the aforementioned objective, the method for obtaining a clear image of the present invention is executed by a digital signal processor (DSP) chip or a microprocessor of an electronic device, for merging a first digital and a second digital image with different focal lengths into a third digital image. The method includes the following steps. Step a: the first digital image and the second image are divided into a plurality of blocks respectively. Step b: an edge detection means is performed to respectively obtain a first edge image of the first digital image and a second edge image of the second digital image, wherein an edge image means that an image contains edge information. Step c: image edge information of corresponding blocks for the first and second edge images are compared one by one. Step d: blocks having more image edge information are selected as clear blocks. Step e: the clear blocks are merged into the third digital image.

The edge detection method, for example, is the Gradient Magnitude, the Laplacian, the Tenengrad, or the 1D Horizontal Filter.

In the method for obtaining a clear image according to a preferred embodiment of the present invention, the edge images mapping to two corresponding blocks may have equivalent image edge information. Therefore, the method for obtaining a clear image of the present invention further includes selecting the blocks having equivalent image edge information, and further dividing the blocks into a plurality of smaller sub-blocks, and then, repeating Steps b-d on the corresponding sub-blocks in the first and second digital images, so as to eliminate the obvious image boundaries.

If obvious image boundaries still exist after the steps of merging the sub-blocks into the clear image, it continues to execute an image boundary processing procedure. The procedure includes the following steps. Corresponding blocks (or sub-blocks) having equivalent image edge information are selected, and gray level information of each pixel in the corresponding blocks (or sub-blocks) is calculated; then, the calculated gray level information magnitude of each of the pixels is compared with those of neighboring pixels (i.e., eight pixels above, below, left to, right to, top left to, bottom left to, top right to, and bottom right to the pixel respectively) one by one, then, pixels having the same or more gray level information are selected as pixels at the boundary of the third digital image. The process of calculating the gray level information is, for example, to calculate the gray level variance between each pixel and the neighboring pixels thereof one by one, the standard deviation, the sum modulus difference, the mean of pixels' gray level or the gray level energy.

As described above, the present invention divides two digital images with different focal lengths into a plurality of blocks, so as to perform the edge detection. Blocks having more complete edge images at corresponding positions are merged into a single clear image, and the gray level information of each pixel is used to fine adjust the image boundaries that appear when the images are emerged, so as to make the image appear more natural. Therefore, the present invention is capable of adjusting the depth of field of the shot image with a fixed diaphragm.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The patent application filed contains at least one drawing executed in color, copies of the patent or patent application with color drawings will be provided by the Office upon request and payment of the necessary fee.

The present invention will become more fully understood from the detailed description given herein below for illustration only, which thus is not limitative of the present invention, and wherein.

DETAILED DESCRIPTION OF THE INVENTION

Objectives of the present invention and methods for achieving the objectives will be described in detail below through the preferred embodiments. However, the concept of the present invention can also be applied in other scopes. The embodiments below are merely intended to illustrate the objectives and the implementing methods of the present invention, but not to limit the scope of the present invention.

Figure 1:
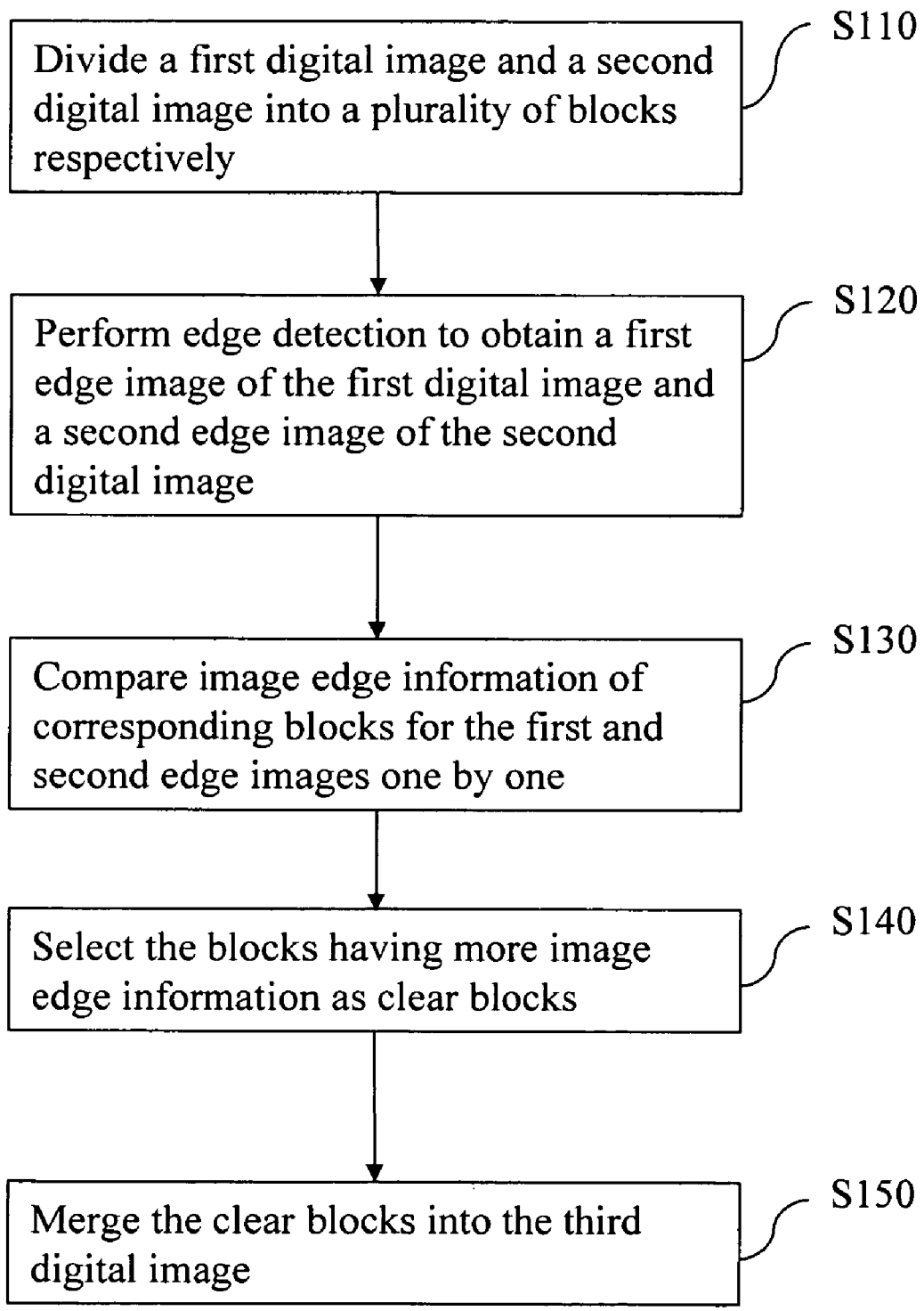
FIG. 1 is a flow chart of a method for obtaining a clear image according to a preferred embodiment of the present invention.

FIG. 1 is a flow chart of a method for obtaining a clear image according to a preferred embodiment of the present invention. Referring to FIG. 1, in this embodiment, an electronic device (e.g., a mobile phone or a PDA) with a built-in DC module adjusts the focal length through physical driving principles such as electromagnetic forces, so as to obtain two images with different focal lengths. Then, the method for obtaining a clear image of the present invention is executed by a digital signal processor (DSP) chip or a microprocessor (MPU), which includes the following steps.

Step a: a first digital image and a second digital image are respectively divided into a plurality of blocks (S110);

Step b: edge detection is performed to respectively obtain a first edge image of the first digital image and a second edge image of the second digital image (S120);

Step c: image edge information of corresponding blocks for the first and second edge images is compared one by one (S130);

Step d: blocks having more image edge information are selected as clear blocks (S140); and Step e: the clear blocks are merged into the third digital image (S150).

The user can set the size of the blocks via a user interface of the electronic device, or the user can divide the first and second shot digital images according to a preset block size of the electronic device. For example, the shot image has 800*600 pixels, and the preset block size is 40*30 pixels, so the image can be divided into 400 blocks. After the first and second digital images are divided, the edge detection is performed on the first and second digital images through the DSP chip or the MPU. The so-called edge refers to different gray level characteristics of an image, that is, the boundary for outlining an object in a sketch. The edge images can be obtained through, for example, a Gradient Magnitude mode, a Laplacian mode, a Tenengrad mode, and a 1D Horizontal Filter mode, which is not limited herein.

In this embodiment, the processes of obtaining the edge images through the Gradient Magnitude mode or the Laplacian mode are described.

Gradient Magnitude Mode

The Gradient Magnitudes are obtained by multiplying matrixes of each pixel value for the first and second digital images with horizontal and vertical gradient operators. Then, the first and second edge images are depicted according to the gradient magnitudes of each pixel, in which the gradient operators are, for example, Sobel operator, which is expressed as follows:

$$\text{Horizontal Gradient Operator} = \begin{bmatrix} -1 & 0 & 1 \\ -2 & 0 & 2 \\ -1 & 0 & 1 \end{bmatrix};$$

$$\text{Vertical Gradient Operator} = \begin{bmatrix} -1 & -2 & -1 \\ 0 & 0 & 0 \\ 1 & 2 & 1 \end{bmatrix}.$$

Laplacian Mode

The first and second edge images can also be depicted after the convolution of the matrixes of each pixel in the first and second digital images with a 3*3 Laplacian operator, which is expressed as follows:

$$\text{Laplacian Operator (1)} = \begin{bmatrix} 0 & 1 & 0 \\ 1 & -4 & 1 \\ 0 & 1 & 0 \end{bmatrix}; \text{ or}$$

$$\text{Laplacian Operator (2)} = \frac{1}{3}\begin{bmatrix} 1 & 1 & 1 \\ 1 & -8 & 1 \\ 1 & 1 & 1 \end{bmatrix}.$$

Moreover, both the first and second edge images can be depicted after the convolution of the matrix of the pixels for the first and second digital images with the Laplacian operator (1) or the Laplacian operator (2).

After obtaining the first and second edge images, the corresponding blocks in the first and second digital images are sequentially selected, and the amount of the image edge information at the positions where the blocks are mapped to the first and second edge images is compared. The process of determining the amount of the image edge information is, for example, to add the gradient magnitudes of each pixel in the block, and to compare two corresponding blocks in the first and second digital images, and then to select the block having a higher sum of gradient magnitudes as a clear block. Generally speaking, the sum of the gradient magnitudes for the vague blocks is relatively small, and the sum of the gradient magnitudes for the clear blocks is relatively large. Therefore, the above method can be used to compare and to determine which block is clearer between two corresponding blocks.

In this preferred embodiment, the block having a larger sum indicates the block having more edge information, so it is selected as the clear block. When the "clear block" of each corresponding block for the first and second digital images is determined, the clear blocks are integrated to obtain a third digital image according to the corresponding coordinates. However, when selecting the "clear blocks", two corresponding blocks may have equivalent edge information, and as a result, it cannot determine which one is the "clear block". If the "clear block" is selected randomly, the boundary where the two images are merged may become vague. In order to overcome the disadvantages that the boundary (i.e., the edge blocks) becomes vague, the following steps are further performed.

Firstly, the corresponding blocks having equivalent image edge information in the first and second images are selected as the edge blocks, and meanwhile, the gray level information of each pixel in the edge blocks of the first and second images is calculated. In this embodiment, the gray level information is calculated by means of calculating the gray level variance between a pixel and its neighboring pixels. In addition, the gray level information of the pixel can also be calculated through other ways, such as the standard deviation, the sum modulus difference, the mean of pixels' gray level, or the gray level energy. For example, if the gray level value of the pixel at coordinates (2, 2) in the first digital image is 200, and the coordinates and gray level values of the neighboring pixels are respectively (1, 1, 150), (1, 2, 150), (1, 3, 150), (2, 1, 150), (2, 3, 150), (3, 1, 150), (3, 2, 200), and (3, 3, 200). If the gray level information refers to the mean of pixels' gray level of the pixel and its neighboring pixels, the gray level information of, the pixel is obtained as (2, 2, 167) after calculation. Then, the gray level information of each pixel in the edge blocks of the first and second digital images is compared one by one, and the pixels having the same or more gray level information are selected as the pixels in the edge blocks of the third digital image.

In one embodiment, Step d in the method for obtaining a clear image (blocks having more image edge information are selected as clear blocks) further includes dividing the edge blocks into smaller sub-blocks, so as to prevent the problem that there are too many edge blocks of the first and second images since the blocks are too large and thus influencing the clarity of the third digital image. After the clear blocks, the vague blocks, and the edge blocks of the first and second images are defined, each of the edge blocks of the first and second images is further divided into a plurality of sub-blocks. Then, Steps b-d are repeated on the corresponding sub-blocks in the first and second images. By means of further dividing the edge blocks and repeating Steps b-d, the area of the edge blocks between two images can be effectively reduced when the images are emerged. After the area of the edge blocks is reduced, the operation of overcoming the vagueness at the boundary (i.e., the process of determining the edge blocks according to the gray level information of the pixels) when merging the images can be performed on the edge blocks, so as to make the obtained third image be much clearer. The process of overcoming the vagueness at the boundary when merging the images has already been described above, and will not be described again here.

Figure 2:
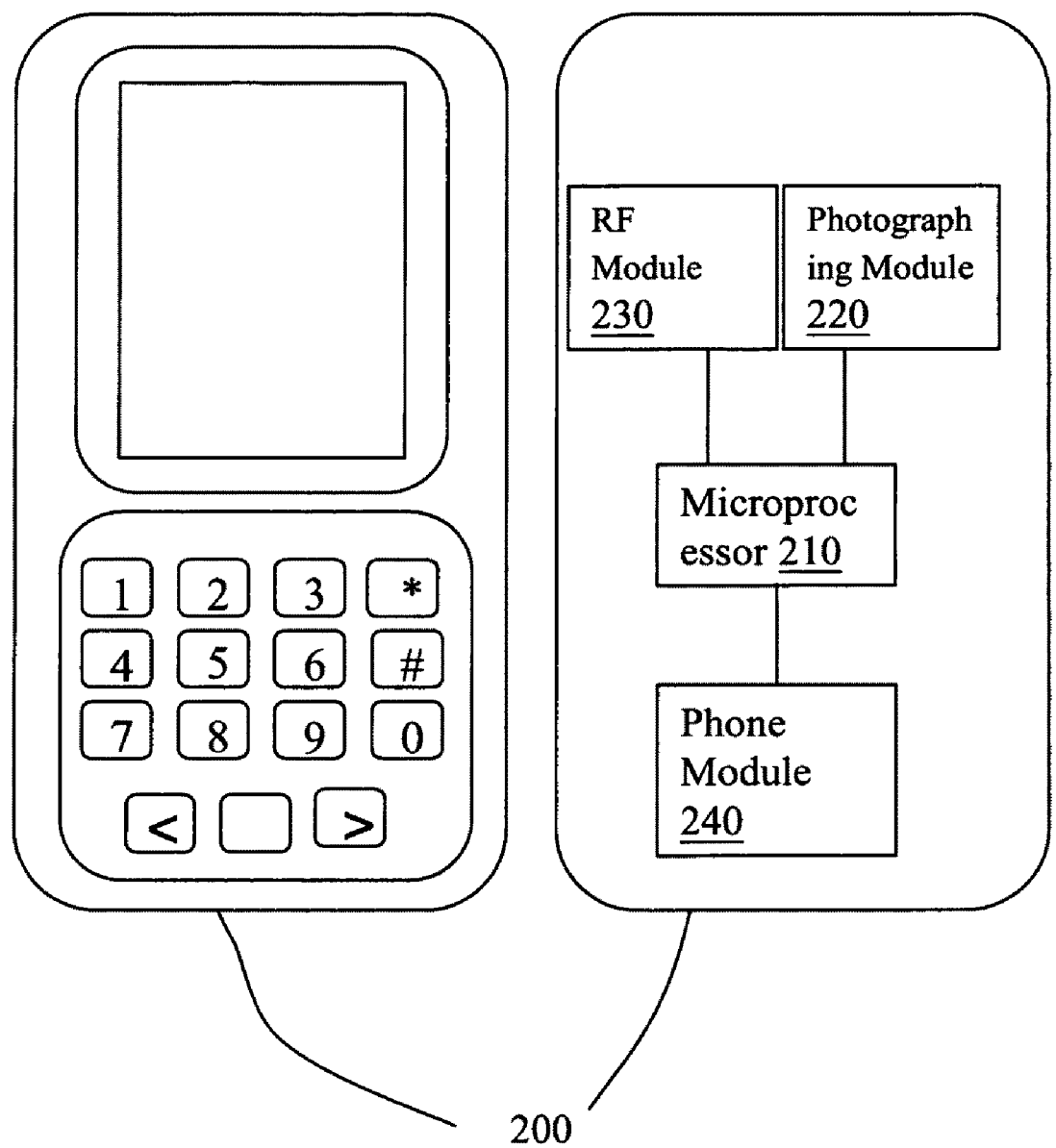
FIG. 2 is a schematic view of an electronic device according to another preferred embodiment of the present invention.

In order to more clearly describe the present invention, another preferred embodiment is described below in this paragraph. FIG. 2 is a schematic view of an electronic device according to another preferred embodiment of the present invention. Referring to FIG. 2, in this preferred embodiment, the electronic device, for example, a mobile phone 200, includes a microprocessor 210, a photographing module 220, an RF module 230, and a phone module 240. The photographing module 220 (i.e., the built-in DC module) is a photographing module with a fixed diaphragm, which uses physical means such as mechanical means or electromagnetic forces or other equivalent means to automatically adjust the focal length, such that the system automatically takes two digital images with different focal lengths when photographing an object; the microprocessor 210 is built-in in the electronic device, and performs various steps (steps a-e) of the method for obtaining a clear image described above, so as to capture the clear parts of the two digital images with different focal lengths and merge them into a single digital image having a broader clear area, and thus achieving the effect of adjusting the depth of field to increase the depth of field of the image.

Figure 3A:
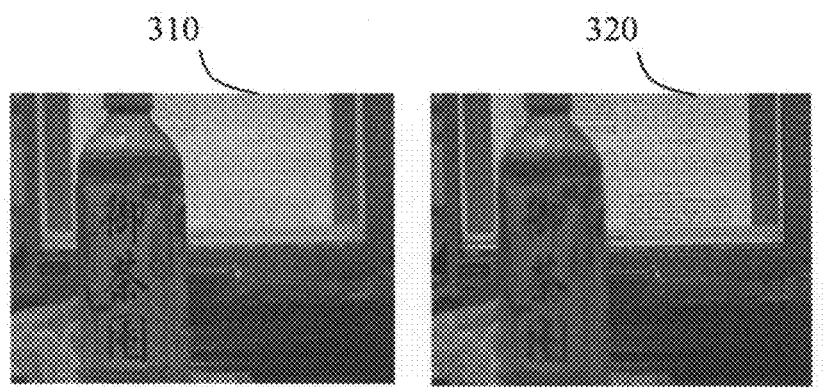
FIG. 3A shows images taken by an electronic device according to another preferred embodiment of the present invention.

FIG. 3A shows images taken by an electronic device according to another preferred embodiment of the present invention. Referring to FIG. 3A, the two digital images with different focal lengths taken by the electronic device (e.g., a mobile phone or a PDA) with a built-in DC module are respectively referred to as a first digital image 310 and a second digital image 320 below. The first digital image 310 is focused at the PET bottle, so the object in the front is relatively clear, while the background scenery (e.g., the characters on the screen) is relatively vague. The second digital image 320 is focused at the screen, so the characters on the screen in the second digital image 320 are clearer than those in the first digital image.

Figure 3B:
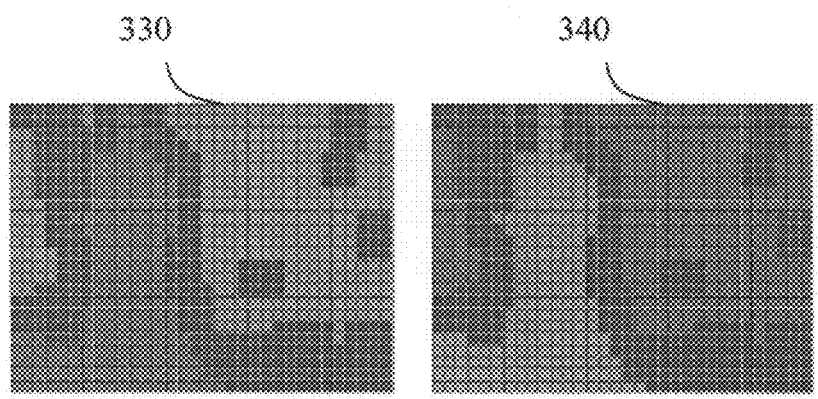
FIG. 3B are schematic views of selecting clear blocks of FIG. 3A.
Figure 3C:
FIG. 3C is a schematic view of the merged image of FIG. 3A.

After the electronic device receives the first and second digital images (310, 320), Steps a-d are performed, so as to obtain the schematic view of selecting the clear blocks (FIG. 3B). Referring to FIG. 3B, in the clear block distribution 330 of the first digital image and the clear block distribution 340 of the second digital image, the blocks marked blue are clear blocks, the blocks marked red are vague blocks, and the blocks marked green are edge blocks when the first and second digital images are emerged. At this time, the edge blocks (i.e., the blocks marked green) are further analyzed, and the pixels in the edge blocks of the first and second digital images having more gray level information are selected as the clear pixels. The step of selecting the clear pixels in the edge blocks will be described later. After the blocks divided in the first and second digital images are marked, the blocks marked blue in the clear block distribution 330 of the first digital image and the clear pixels selected from the blocks marked green corresponding to the part in the first digital image 310 are captured, and the blocks marked blue in the clear block distribution 340 of the second digital image and the clear pixels selected from the blocks marked green corresponding to the part in the second digital image 320 are captured. Then, the captured parts are merged into the third digital image 350 (as shown in the schematic view of the merged image of FIG. 3C).

The process of selecting the clear pixels in the edge blocks (i.e., the blocks marked green in FIG. 3B) includes the following steps. Firstly, the blocks having equivalent image edge information in the corresponding blocks of the first and second digital images are selected as the edge blocks, and the gray level information of each pixel in the edge blocks is calculated. The process of calculating the gray level information has already been described above, and will not be described again herein. After that, the pixels having the same or greater gray level information in the corresponding blocks of the first and second digital images are selected as the pixels at the boundary of the third digital image. In this preferred embodiment, the gray level information is calculated by means of calculating the gray level variance between each pixel and its eight neighboring pixels. Moreover, the gray level information can also be calculated through other ways, such as the standard deviation, the sum modulus difference, the mean of pixels' gray level, and the gray level energy, which is not limited herein. The problem of non-uniform clear/vague images at the boundary when two images are merged can be solved through the above steps, such that the obtained image looks more natural.

As described above, when the first and second digital images are merged, if the first and second digital images have no edge blocks (i.e., the blocks marked green in FIG. 3B are not existed), the clear blocks of the two digital images can be identified by directly comparing the image edge information. At this time, it is unnecessary to mark the clear pixels in the edge blocks, and the clear blocks in the first and second digital images (e.g., the blocks marked blue in the clear block distributions (330, 340) of the first and second digital images) can be directly merged to obtain the third digital image, and thus, the full-range clear digital image is obtained.

In order to prove that the method for obtaining a clear image of the present invention is capable of truly obtaining the image with a deeper depth of field, and having much more preferred executing speed and clarity after the merging process than the image merging technique in the conventional art, two images with different focal lengths are used to test the performance of the method for obtaining a clear image of the present invention and that of the image merging method through using the "discrete wavelet frame" technology as disclosed in PRC Patent Publication No. CN1402191A (hereinafter referred to as the comparison technology). The target for evaluating the performance is to calculate the mean square error (MSE) and mutual information (MI) of gray level values for each pixel after image merging. The formulae for calculating MSE are listed as follows:

$$MSE = \frac{1}{MN} \sum_{i=1}^{M} \sum_{j=1}^{N} |F'(i,j) - F(i,j)|;$$

M: width of input image (pixels)
N: height of input image (pixels)
F (i, j): merged image
F (i, j): reference image $$MI = \sum_{i=1}^{L_N} \sum_{j=1}^{L_N} P_{R,X}(i,j) \log_2 \frac{P_{R,X}(i,j)}{P_R(i)P_X(j)},$$

$L_N$: degree of gray level
R: reference image
X: merged image
$P_{R,X}$: normalized joint gray level histogram of reference image and merged image $P_R$: normalized marginal histograms of reference image
$P_X$: normalized marginal histograms of merged image It is found through tests that, if the block size is set as 16*16 pixels, MSE measured in the present invention is 0.1318, which is better than 0.1522 of the comparison technology (the smaller the MSE is, the better the performance is), and MI of the present invention is 4.6077, which is better than 4.5922 of the comparison technology (the larger the MI is, the better the performance is). If the block size is set as 32*32 pixels, MSE of the present invention is 0.2666, which is better than 0.3011 of the comparison technology, and MI of the present invention is 4.4896, which is better than 4.4604 of the comparison technology.

To sum up, the present invention obtains the edge information of images through image detection, selects a plurality of clear blocks in the two images according to the completeness (or amount) of the edge information, and merges the two images into a single clear image. Moreover, the present invention makes fine adjustment by comparing gray level information of the pixels at the boundary of the images, so as to make the image become full-range clear. The present invention at least has the following advantages.

1. The present invention can control the generation/acquisition of images with different depths of field through using the existing DC elements, without requiring additional elements to control the diaphragm or a zoom lens.

2. The present invention has no obvious image boundaries, so the shot images look natural.

3. The problem of images having vague edges caused by aberration of DC lenses (i.e., the magnification effect generated by the lenses) can be corrected through the method for obtaining a clear image in the present invention, so as to output clear images.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for obtaining a clear image, executed by a digital signal processor (DSP) chip or a microprocessor, for merging a first digital image and a second digital image shot with different focal lengths into a clear third digital image, the method comprising:
   (a) dividing the first digital image and the second digital image into a plurality of blocks respectively;
   (b) performing an edge detection means in spatial domain to respectively obtain a first edge image of the first digital image and a second edge image of the second digital image;
   (c) comparing image edge information of corresponding blocks for the first edge image and the second edge image one by one;
   (d1) selecting the blocks having more image edge information as clear blocks;
   (d2) selecting the corresponding blocks having equivalent image edge information as edge blocks;
   (d3) dividing the edge blocks into a plurality of sub-blocks;
   (d4) performing Steps (b)-(d1) of the method for obtaining a clear image on the sub-blocks; and
   (e) merging the clear blocks into the third digital image.

2. The method for obtaining a clear image as claimed in claim 1, wherein the edge detection means is selected from a group consisting of a Gradient Magnitude mode, a Laplacian mode, a Tenengrad mode, and a 1D horizontal filter mode.

3. The method for obtaining a clear image as claimed in claim 1, wherein the process for calculating the gray level information is selected from a group consisting of a mode of calculating gray level variance between each pixel and neighboring pixels thereof one by one, a standard deviation mode, a sum modulus difference mode, a mean of pixels' gray level mode, and a gray level energy mode.

4. An electronic device for obtaining a clear image, capable of merging a first digital image and a second digital image with different focal lengths into a third digital image, the electronic device comprising:
   a photographing module with a fixed diaphragm, for automatically shooting the first digital image and the second digital image at different focal lengths respectively; and
   an image processor, built-in in the electronic device, for performing the following steps:
      (a) dividing the first digital image and the second digital image into a plurality of blocks respectively;
      (b) performing an edge detection means in spatial domain to respectively obtain a first edge image of the first digital image and a second edge image of the second digital image;
      (c) comparing image edge information of corresponding blocks for the first and second edge images one by one;
      (d1) selecting the blocks having more image edge information as clear blocks;
      (d2) selecting the corresponding blocks having equivalent image edge information;
      (d3) further dividing the corresponding blocks having equivalent image edge information of the first and second digital images into a plurality of sub-blocks;
      (d4) performing Steps (b)-(d1) on the sub-blocks of the first and second digital images; and
      (e) merging the clear blocks into the third digital image.

5. The electronic device as claimed in claim 4, wherein the edge detection means is selected from a group consisting of a Gradient Magnitude mode, a Laplacian mode, a Tenengrad mode, and a 1D horizontal filter mode.

6. The electronic device as claimed in claim 4, wherein a process of calculating the gray level information is selected from a group consisting of a mode of calculating gray level variance between each pixel and neighboring pixels thereof one by one, a standard deviation mode, a sum modulus difference mode, a mean of pixels' gray level mode, and a gray level energy mode.

7. An electronic device for obtaining a clear image, configured to merge a first digital image and a second digital image into a third digital image, the electronic device comprising:
   a photographing module, operable to automatically shoot the first digital image and the second digital image; and
   an image processor, operable to perform the following steps:
      (a) divide the first digital image and the second digital image into a plurality of blocks respectively;
      (b) perform an edge detection in spatial domain to respectively obtain a first edge image of the first digital image and a second edge image of the second digital image;
      (c) compare image edge information of corresponding blocks for the first and second edge images one by one;
      (d1) select the blocks having more image edge information as clear blocks;
      (d2) select the corresponding blocks having equivalent image edge information as edge blocks;
      (d3) divide the edge blocks into a plurality of sub-blocks;
      (d4) perform Steps (b)-(d1) of the method for obtaining a clear image on the sub-blocks; and
      (e) merge the clear blocks into the third digital image.

8. The electronic device as claimed in claim 7, wherein the image processor further executes the following procedures:
   select the corresponding blocks having equivalent image edge information in the first and second digital images as edge blocks;
   calculate gray level information of each pixel in the edge blocks of the first and second digital images; and
   select the pixels having the same or more gray level information in the corresponding blocks of the first and second digital images as pixels at a boundary of the third digital image.

9. The electronic device as claimed in claim 7, wherein the edge detection means is selected from a group consisting of a Gradient Magnitude mode, a Laplacian mode, a Tenengrad mode, and a 1D horizontal filter mode.

10. The electronic device as claimed in claim 7, wherein a process of calculating the gray level information is selected from a group consisting of a mode of calculating gray level variance between each pixel and neighboring pixels thereof one by one, a standard deviation mode, a sum modulus difference mode, a mean of pixels' gray level mode, and a gray level energy mode.

* * * * *